(12) United States Patent
Dannenberg

(10) Patent No.: US 6,749,436 B1
(45) Date of Patent: Jun. 15, 2004

(54) COMPUTER AIDED TEST PREPARATION

(76) Inventor: Ross Alan Dannenberg, 312 Cameron Station Blvd., Alexandria, VA (US) 22304

( * ) Notice: Subject to any disclaimer, the term of this patent is extended or adjusted under 35 U.S.C. 154(b) by 271 days.

(21) Appl. No.: 10/036,410

(22) Filed: Jan. 7, 2002

Related U.S. Application Data
(60) Provisional application No. 60/307,150, filed on Jul. 24, 2001.

(51) Int. Cl.[7] .................................................. G09B 7/00
(52) U.S. Cl. ........................ 434/323; 434/236; 434/322; 434/362
(58) Field of Search ................................. 434/118, 156, 434/167, 169, 236, 322, 323, 350, 362, 365; 463/17, 25, 40; 345/163; 725/5, 105, 133; 709/203, 204; 706/47, 926

(56) References Cited

U.S. PATENT DOCUMENTS

| | | | | |
|---|---|---|---|---|
| 5,002,491 A | * | 3/1991 | Abrahamson et al. | 434/322 |
| 5,034,807 A | * | 7/1991 | Von Kohorn | 725/5 |
| 5,456,607 A | * | 10/1995 | Antoniak | 434/323 |
| 6,024,577 A | * | 2/2000 | Wadahama et al. | 434/322 |
| 6,120,297 A | * | 9/2000 | Morse, III et al. | 434/169 |
| 6,141,528 A | * | 10/2000 | Remschel | 434/350 |
| 6,443,840 B2 | * | 9/2002 | Von Kohorn | 463/17 |
| 6,648,651 B1 | * | 11/2003 | Cadman et al. | 434/322 |
| 6,652,283 B1 | * | 11/2003 | Van Schaack et al. | 434/236 |
| 2002/0160347 A1 | * | 10/2002 | Wallace et al. | 434/322 |
| 2002/0169822 A1 | * | 11/2002 | Packard et al. | 709/203 |

* cited by examiner

Primary Examiner—Joe H. Cheng

(57) ABSTRACT

A system and method for computer aided test preparation is disclosed. A user submits a weighted answer in response to a test preparation question displayed on a computer display screen. The system and method use the weight of the response to determine the frequency of repetition of that particular question in the user's subsequent test preparation activities. The weight may be an indication of the user's confidence level of his or her submitted response being the correct response to each question.

21 Claims, 3 Drawing Sheets

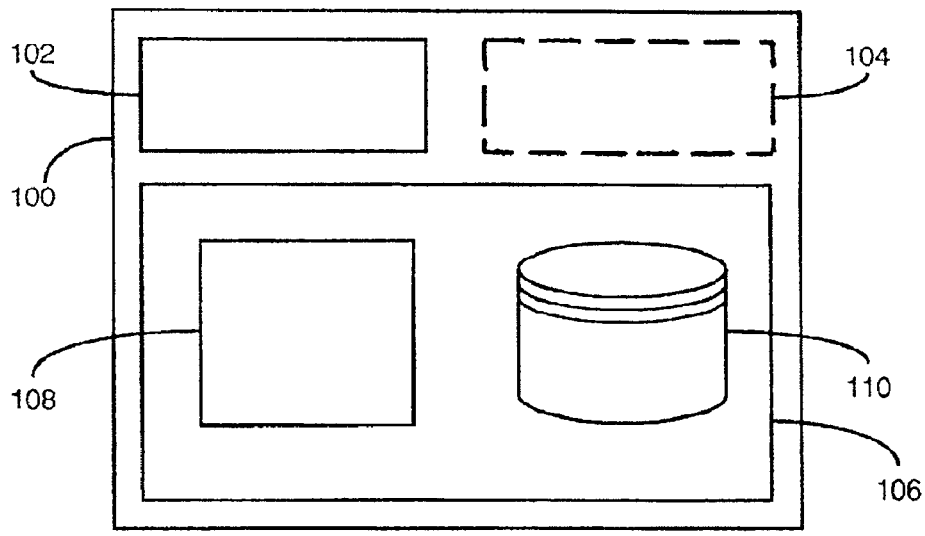

FIG. 1

QUESTION: Regarding the specification of a nonprovisional patent application, which of the following practices is in accordance with proper USPTO practice and procedure?

ANSWER CHOICES:
(A) The specification may include graphical illustrations or flowcharts.
(B) The specification may include tables and chemical formulas.
(C) The specification may include hyperlinks or other forms of browser-executable code embedded in the text.
(D) The specification must begin with one or more claims.
(E) The specification may include a reservation for a future application of subject matter disclosed but not claimed in the application.

Submit response, and I am: SURE   UNSURE

FIG. 2

QUESTION: Regarding the specification of a nonprovisional patent application, which of the following practices is in accordance with proper USPTO practice and procedure?

ANSWER CHOICES:
- ○ (A) The specification may include graphical illustrations or flowcharts.
- ○ (B) The specification may include tables and chemical formulas.
- ◉ (C) The specification may include hyperlinks or other forms of browser-executable code embedded in the text.
- ○ (D) The specification must begin with one or more claims.
- ○ (E) The specification may include a reservation for a future application of subject matter disclosed but not claimed in the application.

CONFIDENCE LEVEL:
- ○ 100% (Confident my response is correct)
- ○ 75%
- ○ 50%
- ○ 25%
- ◉ 0% (I am totally guessing)

[SUBMIT]

FIG. 4

COMPUTER AIDED TEST PREPARATION

This application claims priority to U.S. provisional patent application serial No. 60/307,150, filed on Jul. 24, 2001.

FIELD OF THE INVENTION

The invention relates to the field of test preparation. More particularly, the invention may be embodied in a method and system for weighting a response by a user to a test preparation question and readministering the question to the user based in part on the weighted response.

BACKGROUND OF THE INVENTION

Throughout one's life, e.g., throughout the course of a student's academic career, or a businessperson's professional career, individuals are often required to take a variety of tests or exams for various reasons. For instance, high school students are often required to take a Scholastic Aptitude Test (SAT) or ACT Assessment (ACT) as part of the college application process. College students are often required take the GRE, MCAT, LSAT, or GMAT as part of the application procedure for a variety of types of graduate school studies. Adults, as part of their professional careers, must often take a professional exam to be allowed to pursue their chosen profession, for instance, a state bar exam to practice law in a given state, the patent bar exam to engage in practice with the United States Patent and Trademark Office (USPTO), or medical boards to practice medicine.

The examinations that an individual takes throughout his or her life may have a substantial impact on his or her career. For instance, individuals who score well on the LSAT tend to attend better law schools and obtain higher paying jobs than those who score lower on the LSAT. Likewise, the higher one's score on the SAT, the better college to which one generally gets accepted. As such, there is often much pressure on an individual to do well on any particular exam.

To help individuals study for such tests, test preparation materials and classes are commercially available. For instance, an individual preparing for a test can buy a test preparation book, attend a preparation seminar, or buy computer software, among other things. Computer software typically administers to a user a series of sample test questions to help the user prepare for the actual exam. However, the software is lacking in that the software generally presents the user with a question, accepts the user's response, informs the user of the correctness of his or her answer and why, and then proceeds to the next question. When the program finishes all the questions, the program generally either terminates or starts over, readministering the user the entire set of questions.

Some known software programs record when a user answers a question correctly. After answering a question correctly, the program typically does not re-administer the same question because the user already knows the answer. However, when a user guesses the answer to a question and guesses correctly, the software typically assumes that the user knew the answer just as with any other question answered correctly. As such, the program generally does not readminister the correctly guessed question unless the software program is readministering all the questions in their entirety.

Thus, a test preparation software program is needed that can account for when a user is guessing answers to questions, and readministers questions to the user based whether the user guessed previously in response to the question.

SUMMARY OF THE INVENTION

In a first aspect, the invention is embodied in a method for displaying test preparation questions to a user. A first question, to which a response is requested, is displayed on a computer display screen to a user. A weighted response to the first question is received from the user. When the user's response is correct, the previous steps are repeated for the first question when the weight meets predetermined criteria.

In a second aspect, the invention is embodied in a computer system adapted to present test preparation questions to a user. There is a processor and a memory containing computer readable instruction. When the computer readable instructions are executed by the processor, the computer is caused to perform a set of steps. A first question, to which a response is requested, is displayed on a computer display screen to a user. A weighted response to the first question is received from the user. When the user's response is correct, the previous steps are repeated for the first question when the weight meets predetermined criteria.

In a third aspect, the invention is embodied in a computer readable medium on which computer readable instructions are stored such that, when executed by a computer, they cause the computer to perform a set of steps. A first question, to which a response is requested, is displayed on a computer display screen to a user. A weighted response to the first question is received from the user. When the user's response is correct, the previous steps are repeated for the first question when the weight meets predetermined criteria.

DESCRIPTION OF THE DRAWINGS

FIG. 1 is a block diagram of a computer system adapted according to an embodiment of the invention.

FIG. 2 is an illustration of a computer display screen in a first embodiment of the invention.

FIG. 4 is an illustration of a computer display screen in a second embodiment of the invention.

DETAILED DESCRIPTION OF THE INVENTION

Figure 3:
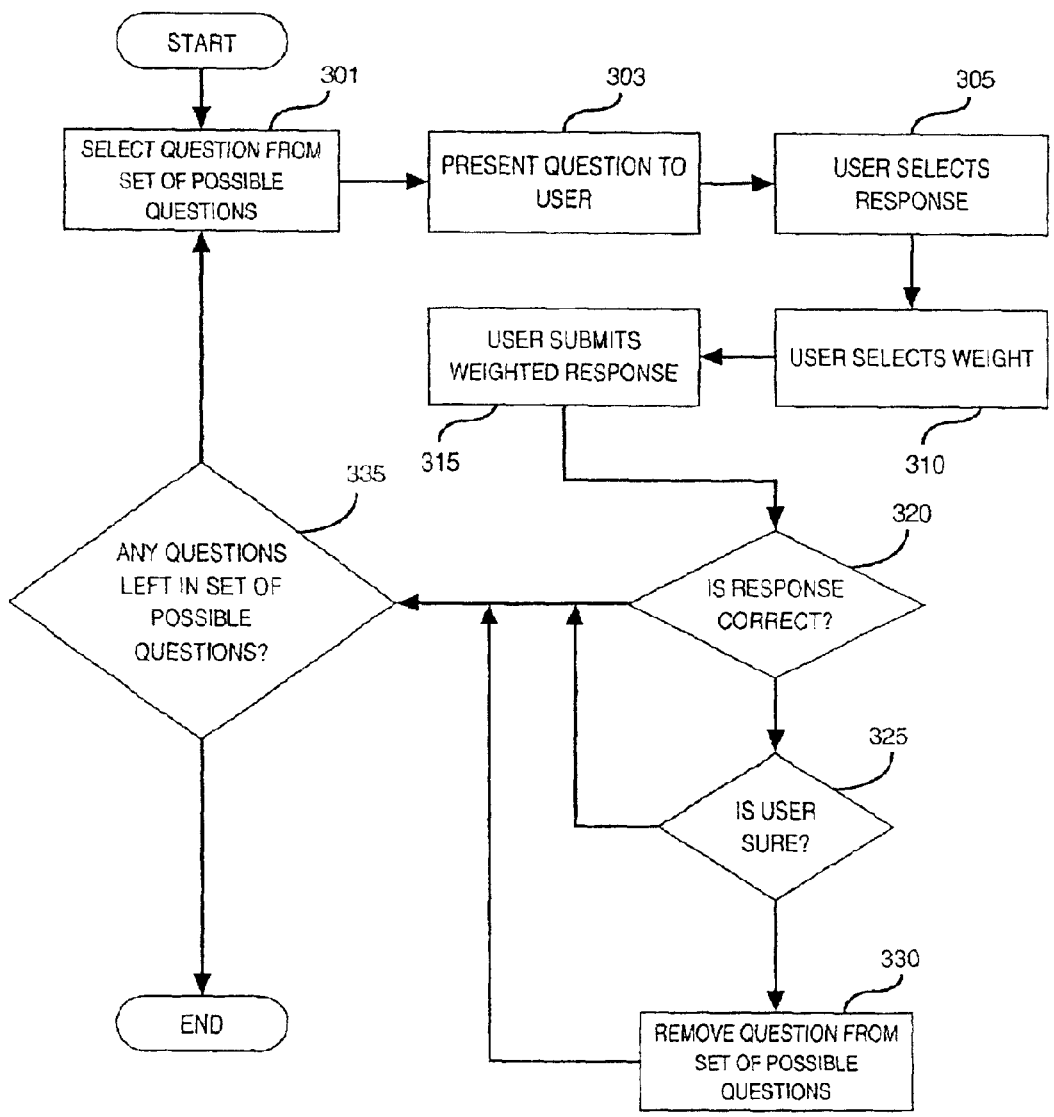
FIG. 3 is a flow chart of an embodiment of the invention.

In one embodiment, with reference to FIG. 1, the invention is embodied in a computer configured to present objective test preparation questions to a user preparing for a test, exam, or the like. An objective question is one to which the most correct response is one of a predetermined set of choices, for example, a conventional multiple choice question or true-false question. The computer 100 has a processor 102, optional volatile memory 104, and non-volatile memory 106 for storing application software 108 and a test question database 110. The database 110 contains sample questions used in preparation for an exam. As used herein, a question may be an actual question used on a previous exam, a question constructed exclusively for purposes of test preparation, or any other statement presented to a user to aid in test preparation, where the statement requires a response by the user. For instance, questions relating to patent practice may be used in an embodiment of the invention directed to preparation for the patent bar exam. Sample questions are often available from the organization for which the test is required, which in this example the Office of Enrollment and Discipline at the USPTO or other government agency responsible for administering the exam.

In a first embodiment of the invention, as well as selecting a response to a question, the user also selects a weight, or confidence level, associated with the user's response to the question. For instance, in one embodiment, as shown in FIG. 2, a user selects one of two confidence levels. The first confidence level is that the user is sure his or her selected response is correct. The second confidence level is that the user is not sure that his or her selected response is correct. After submitting the weighted response, the program continues to operate based in part of the weight.

In this embodiment, application software may be configured to cause a computer to perform the steps shown in FIG. 3. In step 301, a question is picked from the set of possible questions to present to the user. Initially, this set may be the entire set of questions in the database 110, or some subset thereof In step 303, the selected question is presented on the computer display screen to the user. In response to the question, the user, in step 305, selects a response to the question.

In step 310 the user selects a weight associated with the response, where the weight may represent the user's confidence in the correctness of his or her answer. The weighted response is submitted in step 315. The system determines whether the response is correct in step 320. If the response is incorrect, the system checks in step 335 whether there are any questions left in the question set to present to the user. If so, the system returns to step 301. In this manner, the question that the user answered incorrectly remains in the set of possible questions, and thus the user may eventually be prompted again with the same question.

If the response is correct the system checks, in step 325, the user's confidence level in his or her response. If the user was unsure of his or her response, the system proceeds to step 335. If the user was sure of his or her response, the system marks the question to be removed from the question set in step 330. The system then proceeds to step 335, where it will determine whether there are any questions left in the question set. If so, the system proceeds to step 301 and selects a question from the remaining questions, and continues the process until no question remain in the question set. Optionally (not shown), upon successfully depleting the question set, a congratulatory message may be displayed on the computer display screen, informing the user that he or she has successfully completed the question set in preparation for the exam.

In some embodiments the system proceeds through the entire question set before repeating any questions. In other embodiments, the system may choose randomly from the entire set of questions such that it is possible that a question may be repeated before the user has seen every distinct question.

In another embodiment of the invention, as shown in FIG. 4, more than two confidence levels may be used. In this embodiment, one question may be presented to the user more often than another question, depending on the user's confidence level when responding to each question. The number of times a question is redisplayed to the user may be proportional to the user's confidence level during his or her initial response to the question. For instance, a question that a user responds to with a twenty-five percent confidence level may be subsequently presented to a user three times as often as a question to which the user responded with a seventy-five percent confidence level, even when the user responds correctly to each question.

When a question is redisplayed to the user after the user's initial weighted response to the question, the user selects a second response and a second weight associated with the second response. The second response may or may not be the same as the user's initial response, just as the second weight may or may not be the same as the user's initial weight selected for that question. The most recently selected weight may be used to determine the frequency with which the question is redisplayed. In another embodiment, all of the user's selected weights for a question are averaged together, and the average weight may be used to determine the frequency with which the question is redisplayed. In still another embodiment, the most recent n weights submitted with the most recent n responses to a question are averaged together, where n is an integer value greater than zero. The average of the most recent n weights may then be used to determine the frequency with which the question is redisplayed. In another embodiment, the confidence level percentage may be used as a weight for selecting which question to redisplay. That is, those questions with higher confidence levels may be readministered less frequently than those with low confidence levels.

In one embodiment of the invention, a time of response may be used as an indicator of the user's confidence level, without having to affirmatively ask the user his or her confidence level with respect to a question's response. Because it is readily ascertainable how much time an average person takes to read a question of a known length, the amount of time taken to respond to the question beyond the amount of time it generally takes to read the question can be used as a measure of the user's confidence level. For example, it may take an average person twenty to twenty-five seconds to read a short questions of about fifty words, including five short answer choices of one to two words each. If the user correctly responds to the question within about thirty seconds, it may be inferred that the user was not guessing. However, if the user correctly responds to the question but takes over one minute to do so, the test preparation software may infer that the user guessed in response to the question, even though the user answered the question correctly.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method for presenting test preparation questions, comprising the steps of:
   (i) on a display device, displaying to a user a first question to which a response is requested;
   (ii) receiving from the user a weighted response to the first question; and (iii) when the user's response in step (ii) is correct, repeating steps (i) and (ii) for the first question when the weight meets a predetermined criteria,
wherein the weight comprises an amount of time in which the user responded to the question.

2. The method of claim 1, further comprising the step of:
   (iv) averaging all weights received in response to displaying the first question during repetitions of steps (i) and (ii);
wherein the predetermined criteria comprises the average weight falling outside of a predetermined time range corresponding to the first question.

3. The method of claim 1, further comprising the step of:
   (iv) averaging the most recent n weights received in response to displaying the first question during repetitions of steps (i) and (ii), where n is a positive integer;

wherein the predetermined criteria comprises the average weight falling outside of a predetermined time range corresponding to the first question.

4. The method of claim 1, wherein the predetermined criteria comprises the amount of time in which the user responded to the first question provides an indication that the user was guessing.

5. The method of claim 4, wherein the amount of time in which the user responded to the first question is larger than a predetermined average response time corresponding to the first question.

6. The method of claim 1, further comprising the step of marking the first question as complete when the user's response in step (ii) is correct and the weight does not meet the predetermined criteria.

7. The method of claim 1, further comprising the step of repeating steps (i) and (ii) for the first question when the user's response in step (ii) is incorrect.

8. A system for presenting test preparation questions to a user, comprising:
   a processor;
   a memory comprising computer readable instructions that, when executed by the processor, cause a computer to perform the steps of:
   (i) on a display device, displaying to a user a first question to which a response is requested;
   (ii) receiving from the user a weighted response to the first question; and
   (iii) when the user's response in step (ii) is correct repeating steps (i) and (ii) for the first question when the weight meets a predetermined criteria,
wherein the weight comprises an amount of time in which the user responded to the question.

9. The system of claim 8, wherein the computer readable instructions further comprise the step of:
   (iv) averaging all weights received in response to displaying the first question during repetitions of steps (i) and (ii);
wherein the predetermined criteria comprises the average weight falling outside of a predetermined time range corresponding to the first question.

10. The system of claim 8, wherein the computer readable instructions further comprise the step of:
   (iv) averaging the most recent n weights received in response to displaying the first question during repetitions of steps (i) and (ii), where n is a positive integer;
wherein the predetermined criteria comprises the average weight falling outside of a predetermined time range corresponding to the first question.

11. The system of claim 8, wherein the predetermined criteria comprises the amount of time in which the user responded to the first question provides an indication that the user was guessing.

12. The system of claim 11, wherein the amount of time in which the user responded to the first question is larger than a predetermined average response time corresponding to the first question.

13. The system of claim 8, wherein the computer readable instructions further comprise the step of marking the first question as complete when the user's response in step (ii) is correct and the weight does not meet the predetermined criteria.

14. The system of claim 8, wherein the computer readable instructions further comprise the step of repeating steps (i) and (ii) for the first question when the user's response in step (ii) is incorrect.

15. A computer readable medium storing computer readable instructions that, when executed by a processor, cause a computer to perform the steps of:
   (i) on a display device, displaying to a user a first question to which a response is requested;
   (ii) receiving from the user a weighted response to the first question; and
   when the user's response in step (ii) is correct, repeating steps (i) and (ii) for the first question when the weight meets a predetermined criteria,
wherein the weight comprises an amount of time in which the user responded to the question.

16. The computer readable medium of claim 15, wherein the computer readable instructions further comprise the step of:
   (iv) averaging all weights received in response to displaying the first question during repetitions of steps (i) and (ii);
wherein the predetermined criteria comprises the average weight falling outside of a predetermined time range corresponding to the first question.

17. The computer readable medium of claim 15, wherein the computer readable instructions further comprise the step of:
   (iv) averaging the most recent n weights received in response to displaying the first question during repetitions of steps (i) and (ii), where n is a positive integer;
wherein the predetermined criteria comprises the average weight falling outside of a predetermined time range corresponding to the first question.

18. The computer readable medium of claim 15, wherein the predetermined criteria comprises the amount of time in which the user responded to the first question provides an indication that the user was guessing.

19. The computer readable medium of claim 18, wherein the amount of time in which the user responded to the first question is larger than a predetermined average response time corresponding to the first question.

20. The computer readable medium of claim 15, wherein the computer readable instructions further comprise the step of marking the first question as complete when the user's response in step (ii) is correct and the weight does not meet the predetermined criteria.

21. The computer readable medium of claim 15, wherein the computer readable instructions further comprised the step of repeating steps (i) and (ii) for the first question when the user's response in step (ii) is incorrect.

* * * * *